No. 639,741. Patented Dec. 26, 1899.
R. KOEN.
FISH HOOK.
(Application filed Sept. 18, 1899.)

(No Model.)

Witnesses:
Ira D. Perry
J B Weir

Inventor
Robert Koen
By Raymond & Onehundred
Attys.

UNITED STATES PATENT OFFICE.

ROBERT KOEN, OF EVANSTON, ILLINOIS.

FISH-HOOK.

SPECIFICATION forming part of Letters Patent No. 639,741, dated December 26, 1899.

Application filed September 18, 1899. Serial No. 730,863. (No model.)

*To all whom it may concern:*

Be it known that I, ROBERT KOEN, a citizen of the United States, residing at Evanston, in the county of Cook and State of Illinois, have invented certain new and useful Improvements in Fish-Hooks, of which the following is a specification.

This invention relates to improvements in what are known as "weedless hooks," in which the hook is provided with a guard extending substantially from the point to the shank of the hook to prevent the direct engagement of weeds with the point of the hook, as well as to assist the hook in turning over and avoiding weeds and like obstructions with which it may come in contact. Prior to my invention, so far as I am aware, the guard of every hook of this character has been either a spring-guard or a spring-actuated guard, and I have found from experience that such guards, when stiff enough to serve the purpose of guarding against the hooking of weeds, are generally stiff enough to interfere with the proper hooking of the fish, as well as tending to aid the fish in throwing the hook out of his mouth when the fish is insecurely hooked, and this is especially true in casting for large or game fish, in which sport a large and heavy bait that practically covers and conceals the hook is generally employed, such as a frog or a chunk of salt pork.

The purpose of my invention is to avoid these objections by providing the hook with a flexible but non-elastic guard, which while subserving all the purposes of the ordinary spring-guard hook retains all the advantages of an ordinary unguarded hook by reason of the guard yielding readily to pressure and remaining wherever forced, so that it does not exert any pressure in any direction or tend in any wise to assist the fish in his efforts to throw out the hook, but on the contrary would rather interfere with such operation by projecting directly in front of the fish's nose.

The object of my invention is attained by the device illustrated in the accompanying drawings, in which—

Figure 1:
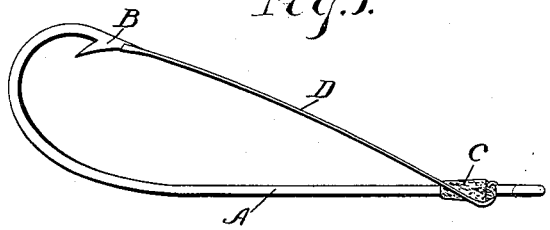
Figure 2:
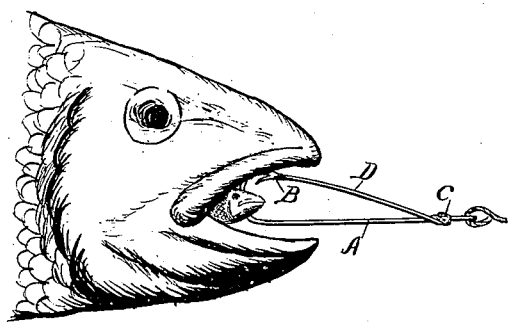
Figure 3:
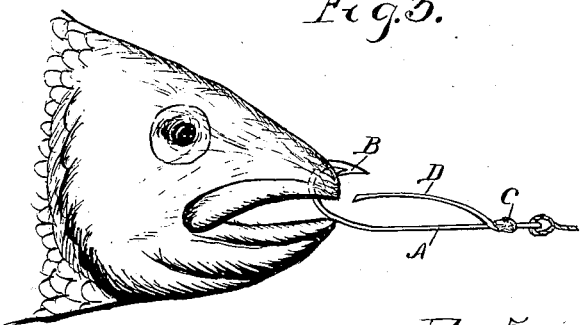
Figure 4:
Figure 5:
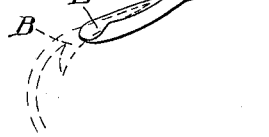

Figure 1 is a side elevation of a fish-hook embodying my invention. Fig. 2 illustrates the manner in which the hook and bait are taken by a fish. Fig. 3 illustrates the position of the guard after the fish has taken the bait and is hooked. Fig. 4 is an enlarged detail showing the meeting-point of the hook and guard; and Fig. 5 is a perspective view of the end of the guard, showing the point of the hook in dotted lines.

Similar letters of reference indicate the same parts in the several figures of the drawings.

Referring by letter to the accompanying drawings, A indicates a fish-hook of any suitable construction, being ordinarily composed of steel bent in the usual form and having the spear-point B properly disposed with relation to the shank thereof. To the shank of this hook I secure in any suitable manner, preferably by a lump of solder C, one end of a guard D, the opposite end of which terminates close to and preferably is of sufficient length to lie against the under side of the point B of the hook. The guard D in the hooks which I have made and used has been composed of a piece of copper wire; but, so far as relates to the broad idea of my invention, the guard may be composed of any other kind of wire or other material that is flexible and non-elastic which will subserve the intended purpose. This guard I prefer, as before stated, to attach to the shank of the hook by means of a lump of solder; but obviously it may be attached thereto in any other suitable, convenient, or desirable manner, such as by winding and pressing the end of the guard around the shank of the hook or by a suitable wrapping, or, indeed, by any other means which may suggest themselves to one skilled in the art, which means are so obvious as not to require illustration or description herein. I also prefer to form a groove E in the end of the guard, which may be flattened and slightly enlarged at the end to receive and form a more effective guard for the sharp point of the hook, although such groove is not essential to the broad idea of my invention.

In the use of my hook the tongue will be bent down practically to the position shown in Fig. 3, when the bait—such as a minnow, frog, or chunk of meat—is applied to the hook and the guard must be bent back again in contact with or adjacent to the point of the hook in order to prepare the hook for service. During service, when a fish takes the hook and its jaws close down thereon, the guard will be easily flexed and bent down to substantially the position shown in Fig. 3, offering no resistance to the taking of the hook by the fish, but remaining in whatever position it is forced to by the pressure. Each time a fish is caught or the hook rebaited the guard must of course be flexed or bent away from the point of the hook and reset; but any objection which may be made to this necessary manipulation of the guard will be far more than offset in the mind of the sportsman-like fisherman by the advantages gained in the action of the hook in the water and when it is taken by the fish. These advantages are of paramount importance as compared with the slight effort necessary to manipulate the hook, as I have found by practical use of my invention by myself and others that the percentage of fish lost after striking at the hook is far less than that with the ordinary spring-guarded hook.

Having described my invention, what I claim, and desire to secure by Letters Patent, is—

1. The combination with a fish-hook, of a flexible non-elastic guard secured at one end to the hook and constituting a guard for the point thereof, substantially as and for the purpose described.

2. The combination with a fish-hook, of a flexible non-elastic guard rigidly secured at one end to the shank of the hook and terminating at its opposite free end adjacent to the point of the hook, substantially as and for the purpose described.

3. The combination with a fish-hook, of a flexible non-elastic guard rigidly secured at one end to the shank of the hook and terminating at its opposite free end adjacent to the point of the hook, said free end being provided with a groove in which the point of the hook lies substantially as and for the purpose described.

ROBERT KOEN.

Witnesses:
ARTHUR P. WYMAN,
FRANK T. MURRAY.